United States Patent [19]
Saunders et al.

[11] 3,925,098
[45] Dec. 9, 1975

[54] POSITIVE ELECTRODE FOR ELECTRICAL ENERGY STORAGE DEVICE

[75] Inventors: Richard C. Saunders, Simi; Laszlo A. Heredy, Canoga Park, both of Calif.

[73] Assignee: Electric Power Research Institute, Palo Alto, Calif.

[22] Filed: Nov. 27, 1974

[21] Appl. No.: 527,678

[52] U.S. Cl. .............................................. 136/6 LF
[51] Int. Cl.² ........................................ H01M 35/00
[58] Field of Search .................... 136/6 LF, 83 T

[56] References Cited
UNITED STATES PATENTS

| | | |
|---|---|---|
| 3,770,503 | 11/1973 | Brabson, Jr. .................... 136/6 LF |
| 3,811,947 | 5/1974 | Metcalfe et al. .................. 136/6 LF |
| 3,841,912 | 10/1974 | Kagawa .......................... 136/83 T X |
| 3,852,114 | 12/1974 | Dubin ............................... 136/83 T |

Primary Examiner—John H. Mack
Assistant Examiner—C. F. Lefevour
Attorney, Agent, or Firm—L. Lee Humphries; Henry Kolin; Clark E. DeLarvin

[57] ABSTRACT

A rechargeable electrical energy storage device including a negative electrode containing lithium, an electrolyte containing lithium ions and a positive electrode containing a selected transition metal chalcogenide, the positive electrode including a porous matrix impregnated with particles of the selected transition metal chalcogenide, the porous matrix comprising a felt formed from resilient carbon fibers or filaments.

20 Claims, 2 Drawing Figures

POSITIVE ELECTRODE FOR ELECTRICAL ENERGY STORAGE DEVICE

BACKGROUND OF THE INVENTION

1. Field of the Invention

This invention relates to an improved high-temperature electrically regenerable electrochemical system. It more particularly relates to a lithium or lithium alloy molten salt transition metal chalcogenide secondary cell or battery providing long cycle life at high energy densities and having high coulombic efficiency under conditions of repeated cycling.

2. Prior Art

The use of lightweight and highly electropositive lithium metal electrodes is desirable for high energy density, high power density battery systems. However, since lithium is highly reactive in aqueous solutions, lithium-anode cells have been prepared utilizing as nonaqueous electrolytes various organic solvents having a dissolved therein conductive salts, in conjunction with various cathode materials (depolarizers). In U.S. Pat. Nos. 3,043,896 and 3,248,265, a lithium negative electrode is used with an electrolyte solution of isopropyl amine saturated with lithium perchlorate, silver sulfide being used as the positive electrode. In U.S. Pat. No. 3,279,952 the cell electrolyte consists of acetic anhydride containing soluble salts such as lithium perchlorate. In U.S. Pat. No. 3,380,855 the electrolyte is methyl formate containing lithium perchlorate as conductive material. In U.S. Pat. No. 3,511,716 the cell has a negative electrode of lithium, a positive electrode of copper sulfide, and a nonaqueous electrolyte comprising a solution of lithium perchlorate in tetrahydrofuran and additionally containing another solvent capable of increasing the solubility of lithium perchlorate. Similarly in U.S. Pat. No. 3,701,688, the negative electrode is lithium, a solution of lithium perchlorate in tetrahydrofuran is the electrolyte, and the positive electrode is preferably copper sulfide. In U.S. Pat. No. 3,711,334, the negative electrode is lithium, the positive electrode is a metal molybdate such as one of silver, copper, iron, cobalt, or nickel, and the electrolyte is tetrahydrofuran in which various soluble salts of the light metals are dissolved. In French Pat. No. 2,102,463 the electrochemical cell consists of a lithium anode, nonaqueous organic electrolyte, and a compressed powdered mixture of copper sulfide, a plasticized synthetic material, and a porous agent. In French Pat. No. 2,102,561 the cell consists of a lithium anode, a copper sulfide cathode, and a solvent of tetrahydrofuran and dimethoxyethane as nonaqueous battery electrolyte. Studies on a lithium-nickel sulfide battery system have also been reported in which the positive electrode consisted of $Ni_3S_2$ blended with an aluminum conductive binder. The electrolyte consisted of a solution of $LiClO_4$ in an aprotic organic solvent such as propylene carbonate or gamma-butyrolactone.

Lithium-anode cells in which the nonaqueous electrolyte is an organic solvent present many problems which have only been partially solved. Basically these relate to the low current densities and poor coulombic efficiencies obtained with such cells. Problems of compatibility of the solvent and of the included ionic salts with the electrode materials are also encountered.

Because of the foregoing problems encountered with organic electrolytes, other cells using a lithium anode have also been studied. Thus solid-state electrolytes have been used. In U.S. Pat. No. 3,404,035 and 3,476,602, a molten alkali metal is used as the anodic reactant. The cathodic reactant is a metal salt, preferably a sulfide of the metal employed as the anodic reactant. A cantion-conductive solid barrier is interposed between the anode and cathode. In U.S. Pat. No. 3,506,492, the cell shown has a lithium or a lithium alloy anode, an insulating metal oxide cathode, and a lithium sulfate electrolyte, preferably in the solid state. Such cells present severe technological difficulties in providing adequate seals for the solid electrolyte. These seals are needed to avoid mixing of the molten anode and cathode materials. The solid electroytes also tend to be fragile and crack with thermal cycling.

Other lithium-anode cells using a molten or fused salt electrolyte have also been extensively studied. Such high-temperature cells have utilized either molten lithium or a solid alloy of lithium such as lithium-aluminum alloy as the negative electrode, with sulfur, selenium, tellurium, or chlorine as the positive electrode, and a molten salt electrolyte such as the eutectic LiCl-KCl binary composition (m.p. 352°C) or a ternary eutectic mixture consisting of LiI-LiCl-KI (m.p. 264°C) or LiI-LiCl-LiF (m.p. 341°C).

The lithium-sulfur cell using a molten halide electrolyte is of particular interest. See M. L. Kyle et al., "Lithium/Sulfur Batteries for Electric Vehicle Propulsion," 1971 *Sixth Intersociety Energy Conversion* Engineering Conference Proceedings, p 38; L. A. Heredy et al., *Proc. Intern. Electric Vehicle Symp.*, Electric Vehicle Council 1, 375 (1969). Such lithium-molten salt batteries using sulfur positive electrodes when fully developed could provide an energy density of greater than 100 watt-hr/lb. Were a cycle life of 2500 cycles and an operating life of 10 years attainable with these batteries, they could satisfy all the requirements of electric power peaking, which is of great interest to the electric utility industry for providing off-peak energy storage and load leveling.

It has been found, however, that long cycle life is difficult to attain with such high-temperature molten salt batteries containing a sulfur electrode because of the gradual loss of the active sulfur material from the positive electrode compartment at these elevated temperatures. Sulfur loss generally occurs by vaporization of the sulfur or by dissolution of intermediate discharge products (polysulfide ions) in the molten salt electrolyte followed by diffusion from the positive electrode compartment through the bulk of the electrolyte to the negative lithium electrode.

To eliminate some of these problems, it has been proposed (Ser. No. 369,033 filed June 11, 1973 and assigned to the Assignee of the present invention) to use certain selected transition metal chalcogenides as the positive electrode material in lieu of elemental sulfur. The preferred positive electrode materials are copper sulfide, iron sulfide, nickel sulfide, and nickel oxide. The application teaches that the positive electrode materials, which are in solid form at the operating temperature of the molten salt battery, must be made readily available in a finely divided form presenting a high specific surface.

Several methods are suggested for presenting such a high specific surface of the positive electrode material. In accordance with one suggested method a lattice of porous graphite is used, and the lattice is impregnated with the positive electrode material using a slurry of such material in a volatile liquid. The porous graphite lattice then is baked to evaporate the volatile liquid, leaving the positive electrode material in the form of fine particles distributed throughout the interstices of the porous graphite lattice. The other suggested methods are substantially the same as those utilized in the prior art for cathodes which employed elemental sulfur as the positive electrode material.

It now has been discovered that certain problems are encountered when a transition metal chalcogenide is used as the positive electrode material, which problems are not present when the cathode material is elemental sulfur. More particularly, during discharge of a battery which utilizes iron sulfide as the active cathode material, the iron sulfide reacts with lithium to form elemental iron and lithium sulfide. The iron and lithium sulfide so formed occupy a volume approximately twice that of the original iron sulfide. Thus, sufficient void space must be left in the matrix to allow for such expansion in volume. The iron sulfide, iron, and lithium sulfide are solid at the operating temperatures of the battery. Therefore, unlike sulfur, which is liquid at the operating temperature of the battery and can move throughout the substrate to distribute loading, the use of a metal sulfide can result in high localized loading of the substrate. Such high localized loading can result in a physical breakdown of the substrate structure. Obviously, there is still a need for an improved positive electrode utilizing such transition metal chalcogenides as the active material.

SUMMARY OF THE INVENTION

It is an object to the present invention to provide a novel and improved positive electrode for a lithium-molten salt-transition metal chalcogenide electrical energy storage device having a greater cycle life and higher energy density than can be achieved using the known positive electrodes. In accordance with the present invention a rechargeable electrical energy storage device is provided which includes an anode containing lithium, a fused salt electrolyte containing lithium ions, and an improved cathode containing at least one selected transition metal chalcogenide. The improved cathode comprises a porous pliable felt matrix formed from resilient carbon fibers or filaments, the matrix being impregnated with particles of the selected transition metal chalcogenide. The term "carbon" as used herein is generally inclusive of the graphite form of carbon.

In accordance with the present invention a transition metal chalcogenide in particulate form is used as the electrochemically active material of the positive electrode. The advantages obtained using such active materials for the positive electrode are discussed more fully in Ser. No. 369,033, the aforementioned application. The preferred positive electrode materials include copper sulfide, iron sulfide, nickel sulfide, and nickel oxide. The term "chalcogenides" refers to the Periodic Table Group VI electronegative elements in combined form, namely, the oxides, sulfides, selenides, and tellurides. Of these, because of ease of preparation, greater availability, lower molecular weight, and other specific properties, the sulfides and oxides are generally preferred. The sulfides are particularly preferred.

The transition elements are generally considered to be those elements whose two outer principal quantum shells are incomplete. Exact classification of transition elements may vary slightly with different authors. See, for example, Day, Jr. and Selbin, *Theoretical Inorganic Chemistry*, Reinhold Publ. Corp., New York, 1962, pp. 92–95, and Barnett and Wilson, *Inorganic Chemistry*, Longmans Green and Co., New York, 1953, pp. 6–7.

The term "selected transition metal chalcogenides" as herein defined refers to the chalcogenides of those transition elements of the first series of the Periodic Table beginning with vanadium (atomic number 23) and concluding with zinc (atomic number 30), and further including molybdenum (atomic number 42) form the second series of transition elements. While scandium and titanium are ordinarily classified as transition elements based on their atomic structure, they show a general lack of resemblance in their chemical behavior to the other transition elements. Thus scandium and titanium chalcogenides are considered essentially minimal in effectiveness for the purposes of the present invention. Because of the close similarity in behavior between chromium and molybdenum, the chalcogenides of the latter element are considered usable for the present invention. Thus the chalcogenides of the first series of transition metals beginning with vanadium and concluding with zinc, with the further addition of molybdenum, are defined herein as those chalcogenides of specific interest and utility in the practice of the present invention. The preferred transition metal chalcogenides in the practice of the present invention are the chalcogenides of copper, iron, and nickel. Particularly preferred positive electrode materials include copper sulfide, iron sulfide, nickel sulfide, and nickel oxide.

It will, of course, be realized that mixtures or alloys of the desired transition metals or mixtures of their chalcogenides could also be used for preparation of the desired transition metal chalcogenides. For example, a nickel-chromium alloy or a mixture of copper and iron could be converted to the corresponding sulfides, or such metal sulfides prepared by other means could then be mixed and utilized as the positive electrode material.

Also, as is well recognized, the terms "oxide" and "sulfide" are frequently used in a generic sense. For example, five crystallographically defined compounds of nickel sulfide exist. Also, double salts such as those of molybdenum and chromium are also suitable in the form of their alkali metal compounds, e.g., $K_2Cr_2O_7$, $Li_2MoO_4$, $Na_2MoO_4$, $Li_2CrO_4$, $K_2MoS_4$. While not all forms of oxides and sulfides of the same transition metal element will behave in the same manner and be equally preferred, the most suitable form may be readily selected, particularly with reference to obtainable cycle life and theoretical energy density of the lithium-molten salt cell in which this compound is used as the positive electrode.

Heretofore when the chalcogens such as sulfur, selenium, and tellurium, particularly sulfur, were utilized as the positive electrode materials in a lithium-molten salt cell, loss of the molten chalcogen from the positive electrode compartment became substantial with repeated cycling. The transition metal chalcogenides are non-volatile solids at the temperature of operation of the lithium-molten salt cell and are relatively insoluble in the molten salt electrolyte. The addition of a lithium chalcogenide to the molten lithium-containing electrolyte further reduces the solubility of the corresponding positive electrode chalcogenide in the molten salt. Hence when these compounds are utilized as the positive electrode material, there is essentially negligible loss of the positive electrode material over a great number of cycles. It has been found that cells using transition metal chalcogenides have lower voltages (about 1.7 volts for $Cu_2S$) versus lithium than do comparable cells using molten chalcogens (about 2.25 volts for sulfur) per se as the positive electrode materials. However, this reduction of the electromotive potential of the cell using the metal chalcogenide compared with the molten chalcogen is more than offset by the substantial improvement obtained in cycle life.

Because of the need for a rechargeable power-producing secondary cell having a high current density and a low internal resistance, the chalcogenides, which are solid at the temperature of operation of the molten salt cell, must be made readily available in a finely divided form presenting a high specific surface.

Generally, the chalcogenides will have a median particle size of from about 20 to 150 microns and preferably a median particle size of 37 to 63 microns.

Obviously, the finely divided chalcogenides must be confined within some specific volume and advantageously, they will be substantially uniformly distributed throughout such specific volume provided. Further, the products resulting from discharge of an electrical energy storage device utilizing a chalcogenide as the active cathode material will occupy approximately twice as much space as the original chalcogenide. Therefore, the volume of space provided for the chalcogenide must be sufficiently large to allow for such expansion. Also, about 20 to 70 percent of the free volume must be allotted for molten salt electrolyte to provide for satisfactory ionic conduction inside the electrode. Accordingly, the chalcogenide ordinarily may only occupy approximately 15 to 40 percent of the volume provided.

Heretofore, when a rigid porous carbon structure was utilized as a matrix and partially filled with a chalcogenide it was difficult if not impossible to attain the desired uniform distribution of chalcogenide throughout the porous structure. The lack of uniformity resulted in some of the pores of the structure being substantially filled with chalcogenide, while others might be empty. Upon discharge of such a cathode structure, the material contained in a substantially filled pore would expand creating localized stress and generally result in a physical breakdown of the matrix reducing the life of the cathode structure.

In accordance with the present invention, a porous felt body of resilient carbon or graphite fibers is used as the matrix. It has been discovered that such a body of woven or non-woven fibers of carbon or graphite is a particularly effective matrix for retaining the finely divided particles of chalcogenide. Suitable graphite and carbon fiber materials form the subject of U.S. Pat. No. 3,107,154 and are commercially available as felts.

The term "felt," as used herein, contemplates a body of fibrous material having certain specific physical characteristics. Broadly, the term "felt" for the purposes of the present invention contemplates a pliable or compressible porous body or matrix composed of interlocked fliaments or fibers of carbon or graphite, the bulk of which generally are randomly distributed and oriented. The body of fibers may be woven, but preferably is formed from non-woven, randomly distributed fibers which may include a minor portion of fibers extending through the body in a regular pattern or path to impart structural integrity to the body. The porous felt bodies contemplated herein are further characterized by having a low apparent density and specified thickness, and are formed from carbon or graphite fibers or filaments having specified diameters.

Porous fibrous carbon bodies comprising closely woven filaments forming thin sheets of fabric (cloth) are considered of minimal value in accordance with the present invention. Such cloths, while somewhat flexible and resilient, can retain substantially little active cathode material within their interstices. Moreover, even a plurality of thin sheets sewn together have been found to be substantially inferior to the felt bodies of the invention. Indeed, when it is attempted to use a plurality of such thin sheets of cloth sewn together to form a thicker matrix, the active cathode material during discharge can cause a laminar separation of the individual sheets with deleterious effect upon the electrochemical performance of the cathode. Thus, in accordance with the present invention, the contemplated porous, flexible matrix is a low-density compressible porous body of felt formed from resilient carbon or graphite fibers.

The porous felt body or matrix should be formed from resilient carbon or graphite fibers having a diameter within the range of from 10 to 100 microns and preferably from about 20 to 50 microns. In addition, the porous felt matrix should have an apparent density of less than about 20 percent, that is to say, the density of the felt matrix should be less than about 20 percent of the density of carbon or graphite. Generally, the porous felt matrix will have an apparent density of from about 2 to 20 percent, with an apparent density of from 2 to 10 percent of the density of carbon or graphite being preferred. Particularly good results are obtained with a felt matrix having an apparent density of from about 2 to 6 percent.

The felt body or matrix is further characterized as being readily compressible. The compressive strength of the felt should be such that a load of from 0.2 to 5.0 psi (120 to 3500 $kgm/m^2$), will cause at least a 10 percent deformation of the felt. The particularly preferred felts are those that are deformed at least 10 percent by a compressive load of from about 0.2 to 1.0 psi (140 to about 700 $kgm/m^2$). It also generally is preferred that the felt matrix have a thickness when unrestrained (free from any applied load) of from about 0.13 to 2.5 cm with a thickness of from 0.25 to 0.75 cm being particularly preferred.

The improved cathode structure of the present invention preferably is formed by placing the porous matrix in a suitable container or housing, e.g., of metal, ceramic, or dense graphite, and substantially covering the matrix with finely divided particles of the selected chalcogenide. The container, porous matrix, and chalcogenide then are vibrated to cause the finely divided particles of chalcogenide to permeate through the interstices of the porous matrix. Periodically, the porous matrix may be removed and the excess chalcogenide shaken off. The matrix then is weighed to determine the amount of chalcogenide contained therein. Obviously, the amount of chalcogenide contained in the porous matrix should not occupy more than about 35 percent of the void volume of the porous matrix. Generally, it is preferred that the chalcogenide occupy from about 25 to 30 percent of the void volume of the matrix.

In accordance with the present invention, it is not critical that substantially complete uniform distribution of the chalcogenide throughout the porous matrix be obtained initially. More particularly, when the present cathode structure is used, for example, in a battery, which is alternately charged and discharged, the resilient carbon fibers yield and deflect to accommodate expansion of the reacted active materials and movement of the active materials which are displaced by the volume changes of adjacent materials. In those areas where a large concentration of active material exists, such material during the discharge cycle is displaced throughout the matrix by the increased volume of the formed discharge reaction products, which deflect the resilient carbon fibers. Thus, after several cycles, the material is substantially uniformly distributed throughout the flexible felt-like matrix.

The device also includes a lithium-containing negative electrode and a lithium-ion-containing molten salt electrolyte, i.e., molten at the operating temperature of the cell or battery. In such a device, the lithium anode may be either a porous substrate impregnated with liquid lithium or a solid electrode comprising a lithium alloy. Examples of suitable solid lithium alloys include lithium-zinc, lithium-aluminum and combinations thereof. A particularly preferred negative electrode is one containing an alloy of lithium and silicon, as reported in the Application of San-Cheng Lai entitled "Lithium Electrode and an Electrical Energy Storage Device Containing the Same," Ser. No. 513,635 filed Oct. 7, 1974 and assigned to the Assignee of the present invention. Such an alloy has substantially improved electrical potential and energy storage capacity as compared with the prior art lithium alloys.

The term "fused salt electrolyte" as used herein refers to a lithium halide-containing salt which is maintained at a temperature at or above its melting point during operation of the electrical energy storage device. The molten salt may be either a single lithium halide, a mixture of lithium halides, or a eutectic mixture of one or more lithium halides and other alkali metal or alkaline earth metal halides.

Typical examples of binary fused salts are lithium chloride-potassium chloride, lithium chloride-magnesium chloride, lithium chloride-boron chloride, lithium bromide-potassium bromide, lithium fluoride-rubidium fluoride, lithium iodide-potassium iodide and mixtures thereof. Two preferred binary salt eutectic mixtures are those of lithium chloride and potassium chloride (melting point 352°C), and lithium bromide and rubidium bromide (melting point 278°C).

Examples of ternary salts useful as the molten salt electrolyte include calcium chloride-lithium chloride-potassium chloride, lithium chloride-potassium chloride-sodium chloride, calcium chloride-lithium chloride-sodium chloride, and lithium bromide-sodium bromide-lithium chloride. Preferred ternary eutectic mixtures include those containing lithium chloride, lithium fluoride and lithium iodide (melting point 341°C) and lithium chloride, lithium iodide and potassium iodide (melting point 260°C).

The suitable alkali or alkaline earth metal ion should have a deposition potential very close to or preferably exceeding the deposition potential of the lithium ion in the electrolyte. Lithium halide salts can be readily combined with halides of potassium, barium, and strontium. While halides of metals such as cesium, rubidium, calcium, or sodium may be used, these are generally less desirable for use since a substantial proportion of these metals may be codeposited with the lithium when the electrode is charged, with some resulting small loss in potential.

Although the ternary eutectic salt mixtures, particularly those containing the iodides, provide lower melting points, the binary eutectic mixture of lithium chloride-potassium chloride sometimes is preferred on the basis of its lower cost and availability, particularly for batteries to be used in large-scale applications such as electric-powered vehicles and electric utility bulk energy storage.

Preferably, a lithium chalcogenide corresponding to the chalcogenide of the positive electrode is added to the molten salt. Thus where the positive electrode material is a sulfide or oxide, $Li_2S$ or $Li_2O$ is added, respectively, to the molten salt. It has been found that if a saturating amount of the lithium sulfide (about 0.1 wt.%) or lithium oxide (about 0.4 wt.%) is added to the fusible salt electrolyte, long-term cell performance is enhanced. The basic chemistry of the reactions occurring in alkali metal halide molten salt systems has been investigated extensively, but is still only imperfectly understood because of its complexity. See, for example, "Behavior of Metal Oxides and Sulfides in Molten LiCl-KCL Eutectic. Chemical Reactions Forming $O^=$ and $S^=$ Ions." Delarne, *Chim. Anal.* (Paris) 44, 91–101 (1962). C.A. 57, 7982b (1962).

DESCRIPTION OF A PREFERRED EMBODIMENT

For purposes of illustration because of its commercial importance in providing long cycle life at high energy densities, the invention will be particularly described with respect to a preferred embodiment, namely, a secondary or rechargeable electrical energy storage device comprising a lithium-containing anode, a molten salt electrolyte, and a metal sulfide-containing cathode.

Figure 1:
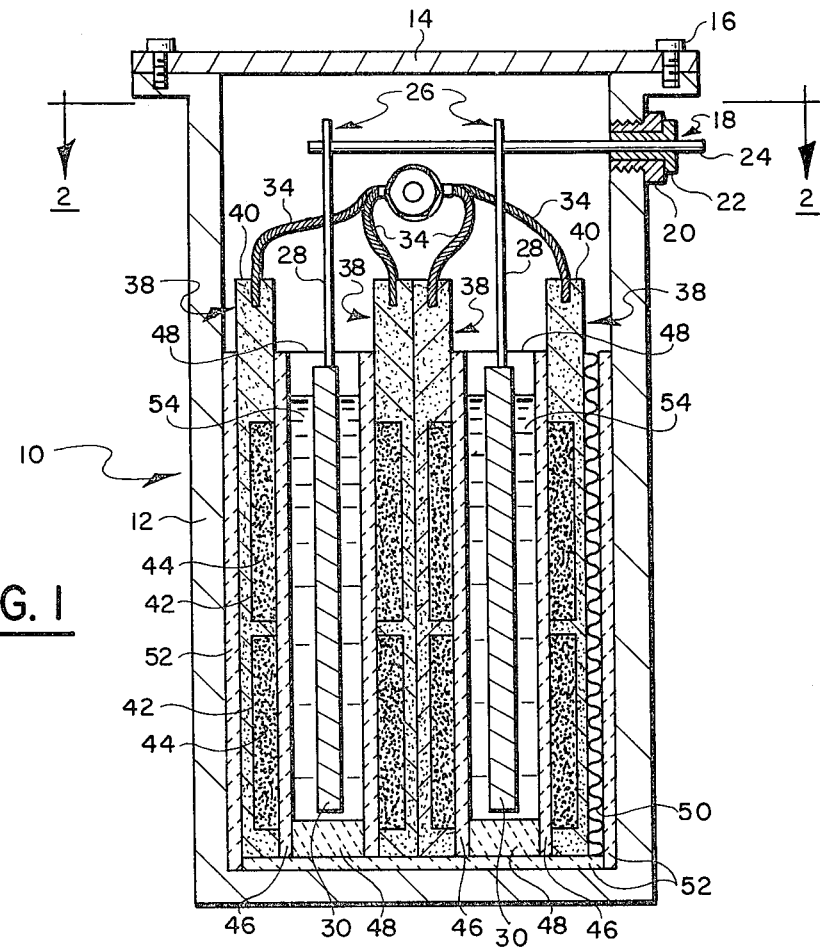
FIG. 1 is a sectional view in elevation of an electrical energy storage device built in accordance with the present invention.
Figure 2:
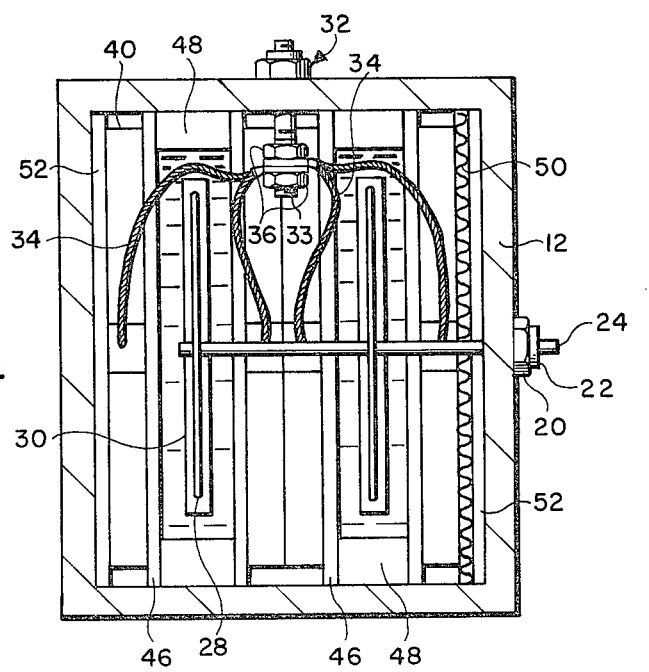
FIG. 2 is a sectional plan view of the electrical energy storage device taken along the lines 2—2 of FIG. 1.

Referring to FIGS. 1 and 2 therein is depicted an electrical energy storage device 10 constructed in accordance with the present invention. The device comprises a steel housing 12, which is provided with a cover 14. The cover preferably is in sealing engagement with the housing, which may be accomplished utilizing known techniques such as polished mating surfaces, seals, gaskets or the like. Cover 14 is secured to housing 12 by a plurality of threaded fasteners 16.

The device is provided with a negative electrode connector means 18, which includes a body member 20, an electrical insulator member 22, and a steel current conducting and supporting rod 24, which projects into the interior of housing 12. Suspended from current conducting and supporting rod 24 are two negative electrode assemblies 26, each of which include a current collecting member 28 and a lithium impregnated substrate 30.

The device further is provided with a positive electrode connector means 32, which is substantially the same as the negative electrode connector means, except that the current conducting and supporting rod terminates just inside the housing. At least that portion of the current conducting and supporting rod inside the housing is provided with a threaded portion 33 for receiving and retaining a plurality of electrical conductors 34 by means of locking nuts 36. Electrical conductors 34 provide electrical communication between the positive electrode connector means 32 and positive electrode assemblies 38.

Each positive electrode assembly 38 comprises a dense graphite housing 40 having one or more cavities 42. In accordance with the present invention, contained within each of the cavities 42 is a porous matrix 44 impregnated with particles of a selected transition metal chalcogenide, the porous matrix comprising a body of woven or non-woven resilient carbon or graphite fibers. The preferred transition metal chalcogenides are copper sulfide, iron sulfide and combinations thereof.

The particles of the selected chalcogenide are retained in cavities 42 by porous ceramic separators 46. Separators 46 and positive electrode assemblies 38 are retained in a substantially fixed desired relationship by ceramic spacers 48 and a spring member 50. Advantageously, spring member 50 comprises a partially compressed body of carbon or graphite fibers. A plurality of ceramic insulators 52 are provided in the housing to provide electrical insulation between the housing and the device components.

The space between separators 46 and negative electrode assemblies 26 is filled with a suitable fused salt electrolyte 54, which is molten at the operating temperature of the device. The device when in operation is heated by any suitable means, not shown. For example, the device or a plurality of such devices, may be contained within an electric furnace or surrounded by resistance heating elements.

The following elements are illustrative of the practice of the invention with respect to certain preferred embodiments, but are not to be construed as limiting with reference to the use of other lithium-containing anodes, fused salt electrolytes, or transition metal chalcogenides not specifically illustrated.

EXAMPLES

An electrical energy storage device was constructed substantially the same as that depicted in FIGS. 1 and 2, except that it contained only two positive electrode assemblies 38 and one negative electrode assembly 26 disposed therebetween. The molten salt electrolyte utilized was a eutectic mixture of LiCl-KCL (melting point 352°C). The negative electrode (anode) assembly comprised a steel current collecting member 28 having attached thereto a porous metal substrate impregnated with lithium. Each of the positive electrode assemblies (cathodes) included a dense graphite housing 40 having a cavity 42 for retaining the body of active cathode material. The cavity had a volume of about 14.78 $cm^3$. A matrix material (a commercially available carbon felt) formed from resilient carbon fibers having a diameter of about 25 microns was obtained. The matrix material had an apparent density of about 3.7 percent. The carbon felt matrix had an unloaded thickness of about 0.75 cm. The matrix was cemented to the bottom of the cavity with carbon cement. About 17.6 percent of the void volume (14.17 $cm^3$) of the matrix material was impregnated with about 12.5 gms of iron sulfide having a particle size of from 37 to 63 microns to form the cathode of the present invention. The cathode so formed had a specific energy storage capacity of 0.6 $Ah/cm^3$ based on the cavity volume and a total energy storage capacity of 8.5 ampere-hours.

The cavity of each electrode assembly 38 was covered with a flat porous ceramic separator 56 having a porosity of about 40 percent and a median pore size within the range of from 20 to 100 microns. The separator comprised an oxide of aluminum. The spacer 48, located intermediate the two positive electrode assemblies 38, was formed from three pieces of a dense oxide of beryllium. The insulators 52 were formed from a dense impervious ceramic material. Located between one positive electrode 38 and insulator 52, was a spring member 50 comprising a resilient body of partially compressed carbon fibers to provide a biasing means for retaining the cathode assemblies, separator members, and spacer members in a desired, substantially fixed relationship.

The electrical energy storage device was connected to a source of power and a load. The device was heated to its operating temperature (about 400°C) and then was cycled by alternately charging and discharging it at a predetermined constant current and for a preselected period of time. The device was operated for about 60 cycles over a period of 61 days at an average coulombic efficiency of 96 percent, during which period about 100 percent of the total energy storage capacity was utilized indicating no loss of the active cathode material.

During operation the temperture varied from a low of 380°C to a high of 450°C. Upon disassembly of the device no evidence of cracks or breakage of any of the components as a result of excess stress was observed.

For comparative purposes the iron sulfide impregnated carbon felt matrix was removed from the cathode assemblies, and the cavities were filled with metal sulfide in accord with the prior art techniques. In accordance with one such technique an intimate mixture of particulate metal sulfide and carbon is used. Generally, at least 25 wt.% of the mixture must consist of carbon in order to obtain uniform current distribution throughout the active material.

As a result of the large volume occupied by the carbon the cathode filled in such manner generally has a specific energy storage capacity of only 0.41 $Ah/cm^3$, based on the volume of the cavity. When a device containing such a cathode is subjected to alternate charge and discharge cycles, only about 45 percent utilization of the active material is obtained (about 0.18 $Ah/cm^3$). Further, the average coulombic efficiency is low, viz., about 75 percent. If a greater volume of particulate iron sulfide and carbon is placed in the cavity, upon discharge of the cathode the material expands, generally resulting in breakage of the separator, housing, or spacer components.

When the foregoing test is repeated using as the matrix a plurality of layers of a closely woven, 0.25 in. (~0.06 cm) thick cloth formed from graphite fibers, substantial difficulty is encountered in attempting to load the matrix with the particulate active cathode material. Indeed, substantially no interstitial loading of the cloth is obtained, rather, most of the active material tends to migrate into the space between the individual layers. When such a cathode is discharged, laminar separation of the individual layers of cloth occurs causing a loss of electrical continuity in the structure. Thus, the cloth (thin dense films of fabric), although flexible, is generally unsuitable.

In accordance with another prior art technique, a substantially rigid porous graphite body is impregnated with particulate iron sulfide. The commercially available rigid graphite structures used heretofore have a substantially smaller void volume (higher apparent density) than the matrix materials of the present invention. Thus, less active material can be impregnated in such structures. In a cavity volume of 14.78 cm³ it generally is not possible to obtain a utilizable specific energy storage capacity greater than about 0.40 Ah/cm³ with particulate iron sulfide impregnated in a rigid porous graphite structure. Further, uniform distribution of the particulate iron sulfide is difficult to obtain in a rigid structure. After operation of a device containing a cathode utilizing an iron sulfide impregnated rigid structure, the structure generally is found to have suffered structural damage as a result of high stresses resulting from non-uniform distribution of the active material.

The foregoing examples clearly demonstrate the advantages of the cathode of the present invention over the prior art structures. Specifically, the present invention provides a cathode having a substantially higher (generally 50 percent or greater) specific energy storage capacity. Further, substantially all of that storage capacity is utilizable at a high coulombic efficiency. Still futher, the problems of obtaining a uniform distribution of active material throughout a rigid matrix are substantially reduced utilizing the improved matrix formed from resilient carbon fibers. Also, the problems associated with non-uniform distribution of the active material are substantially eliminated utilizing the cathode of the present invention. These and many other advantages will be evident to those versed in the art.

It will of course be realized that various modifications can be made in the design and operation of the device of the present invention without departing from the spirit thereof. Thus, while the examples illustrating this invention have been described with respect to specific anodes, electrolytes, temperatures, and other operating conditions, the invention may be otherwise practiced, as will be readily apparent to those skilled in this art. Accordingly, this invention is not to be limited by the illustrative and specific embodiments thereof, but its scope should be determined in accordance with the claims thereof.

What is claimed is:

1. In a rechargeable electrical energy storage device comprising a negative electrode containing lithium, a fused salt electrolyte containing lithium ions, and a positive electrode containing at least one selected transition metal chalcogenide, the improvement wherein the positive electrode comprises a porous, compressible felt matrix formed from resilient carbon or graphite fibers, said matrix being impregnated with particles of the selected transition metal chalcogenide.

2. The device of claim 1 wherein said porous, compressible felt matrix is formed from fibers having a diameter of from about 10 to 100 microns and is compressed at least 10 percent when subjected to an applied load of from about 0.2 to 5 psi.

3. The device of claim 1 wherein said porous matrix has an apparent density of from about 2 to 20 percent.

4. The device of claim 1 wherein the positive electrode further comprises a housing provided with a cavity for receiving said porous matrix.

5. The device of claim 1 wherein said fused salt electrolyte contains at least one lithium halide.

6. The device of claim 1 wherein said fused salt electrolyte comprises a mixture of lithium chloride and potassium chloride.

7. The device of claim 6 wherein said fused salt electrolyte is saturated with a lithium chalcogenide corresponding to the selected transition metal chalcogenide.

8. The device of claim 1 wherein there is provided a porous ion-permeable separator member located intermediate the negative and positive electrodes for isolating said electrodes from one another.

9. The device of claim 1 wherein said transition metal chalcogenide is selected from the group consisting of iron sulfide, copper sulfide and combinations thereof.

10. The device of claim 1 wherein the particles of the selected transition metal chalcogenide have a size of from 20 to 150 microns.

11. The device of claim 1 wherein the chalcogenide comprises at least one transition metal sulfide.

12. The device of claim 11 wherein said porous matrix is formed from fibers having a diameter of from about 10 to 100 microns.

13. The device of claim 12 wherein said porous matrix has an apparent density of from about 2 to 20 percent.

14. The device of claim 13 wherein the positive electrode further comprises a housing provided with a cavity for receiving said porous matrix.

15. The device of claim 14 wherein said fused salt electrolyte contains at least one lithium halide.

16. The device of claim 15 wherein said fused salt electrolyte comprises a mixture of lithium chloride and potassium chloride.

17. The device of claim 16 wherein said fused salt electrolyte is saturated with lithium sulfide.

18. The device of claim 17 wherein there is provided a porous ion-permeable separator member located intermediate the negative and positive electrodes for isolating said electrodes from one another.

19. The device of claim 18 wherein said transition metal sulfide is selected from the group consisting of iron sulfide, copper sulfide and combinations thereof.

20. The device of claim 19 wherein the particles of the selected transition metal sulfide have a size of from 20 to 150 microns.

* * * * *

UNITED STATES PATENT AND TRADEMARK OFFICE
CERTIFICATE OF CORRECTION

PATENT NO. : 3,925,098
DATED : Dec. 9, 1975
INVENTOR(S) : Richard C. Saunders et al It is certified that error appears in the above-identified patent and that said Letters Patent are hereby corrected as shown below:

Column 2, line 5, "cantion" should read --cation--.

Column 5, line 52, "3,107,154" should read --3,107,152--.

Column 7, line 23, "513,635" should read --512,635--.

Column 11, line 20, "futher" should read --further--.

Signed and Sealed this

Thirteenth Day of July 1976

[SEAL]

Attest:

RUTH C. MASON
Attesting Officer

C. MARSHALL DANN
Commissioner of Patents and Trademarks